United States Patent [19]

Wilson, Sr. et al.

[11] Patent Number: 4,734,272

[45] Date of Patent: * Mar. 29, 1988

[54] PHOSPHO-GYPSUM RECOVERY PROCESS

[76] Inventors: Eddie K. Wilson, Sr., 8294 Dogwood Rd., Germantown, Tenn. 38138; Silvio J. Spigolon, 1800 Randolph Pl., No. 4, Memphis, Tenn. 38119

[*] Notice: The portion of the term of this patent subsequent to Jan. 26, 1999 has been disclaimed.

[21] Appl. No.: 899,987

[22] Filed: Aug. 25, 1986

Related U.S. Application Data

[63] Continuation-in-part of Ser. No. 634,965, Jul. 27, 1984, Pat. No. 4,608,238, and Ser. No. 551,051, Nov. 11, 1983, abandoned.

[51] Int. Cl.$^4$ .................. C01F 1/00; C01F 5/10; C01F 25/16
[52] U.S. Cl. ................... 423/178; 423/240; 423/304; 423/320; 423/483; 423/490; 423/522; 423/541 R
[58] Field of Search ............ 423/490, 530, 240 S, 423/522, 490, 178, 304, 541 R, 320, 241, 483

[56] References Cited

U.S. PATENT DOCUMENTS

| | | | |
|---|---|---|---|
| 2,528,103 | 10/1950 | Willson | 423/522 |
| 4,472,363 | 9/1984 | Poller et al. | 423/240 |
| 4,548,797 | 10/1985 | Sauer et al. | 423/240 |
| 4,608,238 | 8/1986 | Wilson et al. | 423/522 |

Primary Examiner—Gregory A. Heller
Attorney, Agent, or Firm—Gravely, Lieder & Woodruff

[57] ABSTRACT

This disclosure involves a process for treating wet phospho-gypsum, a by-product from wet phosphoric acid manufacture, to remove fluorine values so as to make the sulfur values in the phospho-gypsum usable in making sulfuric acid in a contact sulfuric acid plant. The process involves drying the phospho-gypsum at 400°–600° C. to vaporize the fluorine values, the $P_2O_5$ values and water and reacting the hot vapors with lime or limestone to remove the fluorine values as fluorspar. The $P_2O_5$ values are subsequently condensed and used in a phosphoric acid plant. The dry phospho-gypsum is heated to 1200°–1250° C. under reducing conditions to produce $SO_2$ gas and siliceous lime. The $SO_2$ is then passed through a lime or limestone scrubber to eliminate any remaining fluorine values, dried and utilized in a contact sulfuric acid plant.

12 Claims, 1 Drawing Figure

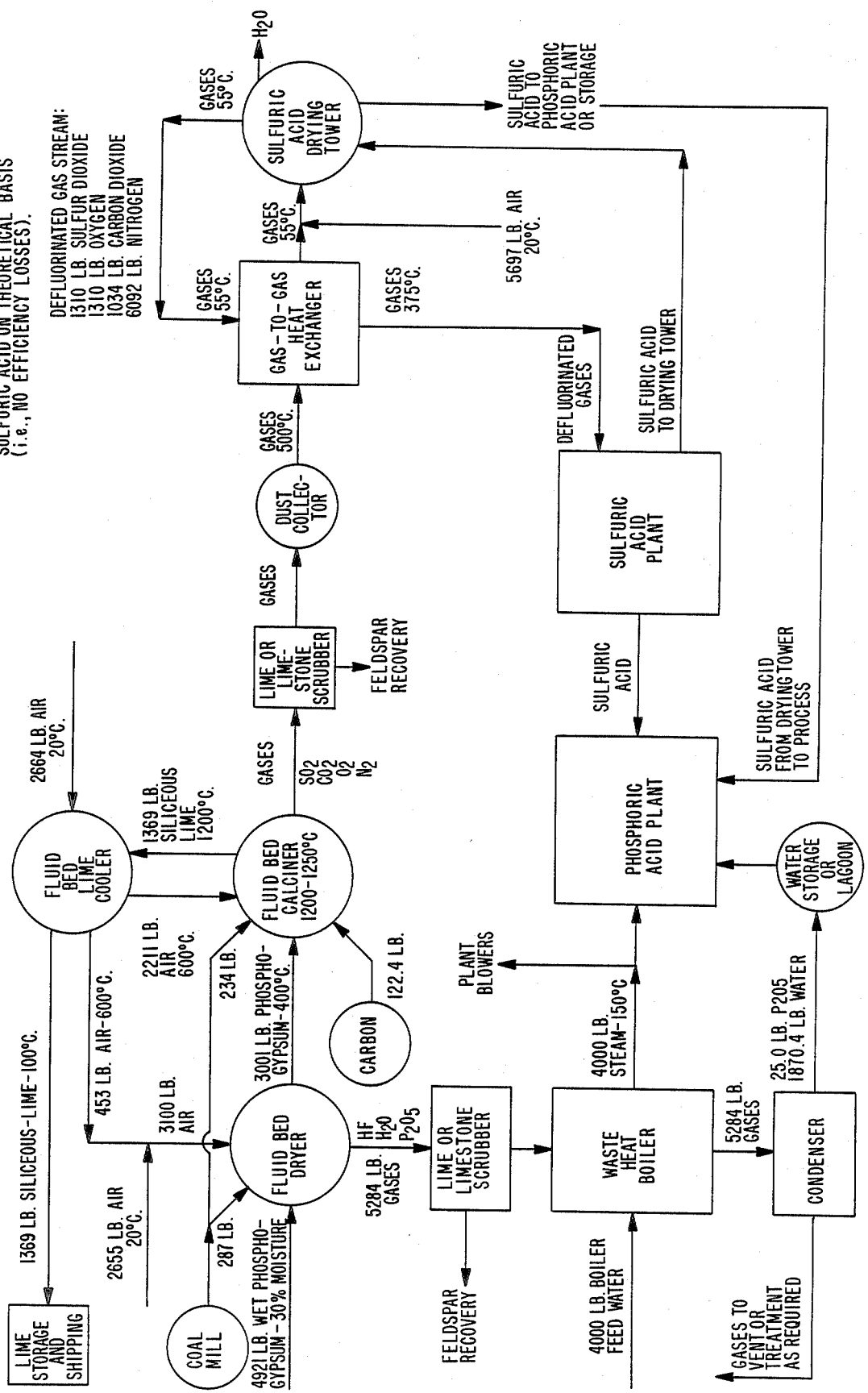

PHOSPHO-GYPSUM RECOVERY PROCESS

REFERENCE TO PRIOR APPLICATION

This application is related to, contains subject matter in common with, and is a continuation-in-part of Ser. No. 634,965 filed July 27, 1984 entited IMPROVED PROCESS FOR TREATING PHOSPHO-GYPSUM WASTE PRODUCT FROM WETACID PROCESS OF MAKING PHOSPHORIC ACID (now U.S. Pat. No. 4,608,238) which was co-pending with U.S. Pat. No. 4,312,842 issued Jan. 26, 1982 and of Ser. No. 551,051 filed Nov. 11, 1983 now abandoned.

BACKGROUND OF THE INVENTION

As discussed in detail in U.S. Pat. Nos. 4,312,842, 4,415,543 and in co-pending application Ser. No. 634,965 (the substances of which are herein incorporated by reference), this invention relates to the wet process or acid process of making phosphoric acid, and particularly relates to the removal of fluorine and phosphorus values from the treatment of the waste phospho-gypsum. The gas stream from phospho-gypsum treatment is free of fluorine to a level which makes the gas acceptable for use with a vanadium oxide catalyst (or other type catalyst) in a contact sulfuric acid plant and the gas has a composition which is desired for efficient operation of the sulfuric acid plant.

The prior art is succinctly described in U.S. Pat. No. 4,312,842 and in co-pending U.S. Pat. No. 4,415,543 and Ser. No. 634,965. The present application is different from and in certain aspects an improvement in these processes in that the fluorine values are removed by treating in a lime or limestone scrubber where the fluorine containing material, including hydrofluoric acid, is converted on the surface of the limestone to fluorspar.

The principal objective of this invention is a process whereby wet phospho-gypsum, the by-product of wet phosphoric acid manufacture, is treated to (a) remove water, acids, and the fluorides in the liquid phase from the phospho-gypsum by drying to about 400 to 600 deg. C., (b) calcine the phospho-gypsum at about 1225 deg. C. to dissociate the lime from the sulfur trioxide, (c) cool and store the siliceous lime (d) effect further fluoride removal from the gases by treatment in lime or limestone, (e) dry the gases in sulfuric acid, and (f) use the resulting gas stream to manufacture sulfuric acid. In this manner, all of the waste phospho-gypsum is recovered as useful products.

As shown in the accompanying drawing, the wet phospho-gypsum is first dried in a fluid bed dryer to 400 to 600 deg. C. The gaseous stream from the dryer is first scrubbed by lime/limestone to remove the fluorides. Virtually all of the volatile fluorides originally in the phospho-gypsum are removed in this step. The hot gases are then used to generate steam for use in the processes. Finally, they are treated, if necessary, and vented. The dried solids from the dryer are sent to a calciner unit.

The calciner is a fluid bed in which a source of carbon is added to the phospho-gypsum and the mixture heated to 1225 deg. C. under reducing conditions. In the final stage, excess air is added to eliminate all undesirable by-product gases, leaving only sulfur dioxide, oxygen, carbon dioxide, and nitrogen. These gases are lime/-limestone scrubbed and then sulfuric acid scrubbed to remove any remaining fluoride gases and to dry the gas stream. The gas stream is then suitable for delivery and use in a modern sulfuric acid plant. These and other objects and advantages will become apparent hereinafter.

The invention also consists in the parts and in the arrangements and combinations of parts hereinafter described and claimed.

DESCRIPTION OF THE DRAWING

The FIGURE is a schematic diagram of a portion of a flow chart for the improved process of treating the phospho-gypsum from a typical phosphoric acid plant.

DETAILED DESCRIPTION

Broadly speaking as in U.S. Pat. Nos. 4,312,842, 4,415,543 and Ser. No. 634,965, the process of the present invention involves the complete utilization of natural phosphate rock in commercially valuable products, leaving only common, innocuous, and ubiquitous gases as a residue. The presently used wet-acid process for using phosphate rock to manufacture phosphoric acid leaves a waste residue of impure phospho-gypsum which is uneconomical and is environmentally repugnant and hazardous.

The improved process will work with all types of natural phosphate rock. Following is a typical chemical analysis:

| Composition of Florida Phosphate Rock - 70/68 BPL (From - A. V. Slack, "Phosphoric Acid", Vol. 1, Pt. 1, 1968) ||
|---|---|
| CaO | 47.14% |
| $P_2O_5$ | 32.23 |
| $H_2O$ | 1.00 |
| $Fe_2O_3$ | 1.26 |
| $Al_2O_3$ | 0.96 |
| Organic | 1.74 |
| $SiO_2$ | 8.72 |
| $CO_2$ | 2.93 |
| $F_2$ | 3.09 |
| $SO_3$ | 0.93 |
| | 100.00% |

Following are basic reactions involved in the wet process method of making phosphoric acid. As an illustration, based on one ton (2000 lbs) of phosphate rock having the composition shown above, the noted amounts of sulfuric acid ($H_2SO_4$) and water are added to the reaction:

| Quantities of Reactants - Per Ton (2000 lbs.) Phos. Rock: |||||
|---|---|---|---|---|
| (1) $Ca_3(PO_4)$ + | $3H_2SO_4$ = | $2H_3PO_4$ + | $3CaSO_4$ | |
| 1408.6# | 1336.2# = | 889.9# + | 1854.9# | |
| (2) $CaF_2$ + | $H_2SO_4$ = | 2 HF + | $CaSO_4$ | |
| 127.0# | 159.6# = | 65.1# + | 221.5# | |
| (3) 6HF + | $SiO_2$ = | $H_2SiF_6$ + | $2H_2O$ | |
| 65.1# | 32.6# = | 78.1# + | 19.6# | |
| (4) $CaCO_3$ + | $H_2SO_4$ = | $CO_2$ + | $H_2O$ + | $CaSO_4$ |
| 133.2# + | 130.5# = | 58.6# + | 24.0# + | 181.1# |

| | | Per Ton Phos. Rock |
|---|---|---|
| Add | Phosphate Rock | 2000# |
| | $H_2SO_4$ (100% Basis) | 1626.3# |
| | $H_2O$ | 1666.5# |
| To Yield | $H_3PO_4$ (100% Basis) | 889.9# |
| | $P_2O_5$ (100% Basis) | 644.5# |
| | Product Acid (30% $P_2O_5$) | 2148.0# |
| | (HF) | (65.1#) |
| | $H_2SiF_6$ | 78.1# |
| | $CO_2$ Gas | 58.6# |
| | $CaSO_4.2H_2O$ | 2895.0# |
| | ($CaSO_4$) | (2289.1#) |

-continued

| Quantities of Reactants - Per Ton (2000 lbs.) Phos. Rock: | |
|---|---|
| $SiO_2$ | 141.8# |
| $Al_2O_3$ | 19.2# |
| $Fe_2O_3$ | 25.2# |
| Phospho-gypsum | 3081.2# |

From this example, it may be seen that the waste product gypsum far exceeds the useful product acid in quantity.

Because the conventional process, and most commercial processes of similar type, do not yield 100% of the available products in the natural ore, the phospho-gypsum waste may contain some unreacted ore, perhaps as much as 3 to 5%. Also, the liquid phase of the phospho-gypsum contains fluorine compounds and residual phosphoric and sulfuric acid.

In U.S. Pat. No. 4,415,543 are shown and described processes for making wet-process phosphoric acid and for treating the phospho-gypsum filter residue to remove $P_2O_5$, fluorine values, and sulfur values as utilizable products. This process utilizes a calcining step where the phospho-gypsum material is heated from 850° C. to about 1250° C. in the presence of coal or other fossil fuel which releases $SO_3$, which then oxidizes to $SO_2$, along with other combustion gases and excess heated air. The fluorine free $SO_2$ containing gas stream goes to a cooler and a sulfuric acid plant if one is in-house at the plant. The sulfuric acid generated from the $SO_2$ can be used in the phosphoric acid process described in U.S. Pat. No. 4,415,543, or it can be processed and sold. The composition of the gas stream, especially the sulfur dioxide and the oxygen contents, must be matched to the requirements of the sulfuric acid plant. Most modern sulfuric acid plants need 10% $SO_2$ and 10% $O_2$ to operate efficiently. It is imperative that the fluorine level in the gas stream be kept below that which will cause damage to the catalyst used in the sulfuric acid plant.

The present invention involves an improvement in the method for removing and recovering the fluorine, phosphorus and sulfur values from the phospho-gypsum, leaving the gas stream from the calciner/furnace system acceptable for use in a modern contact sulfuric acid plant.

As shown in the attached drawing, the wet phospho-gypsum, the by-product of wet phosphoric acid manufacture is mixed with a source of carbon (milled coal) in a fluid bed dryer. The carbon creates a reducing atmosphere. Hot air is used to heat the phospho-gypsum to about 400°-600° C. in the fluidized bed dryer. This temperature vaporizes substantially all of the fluorine containing materials in the phospho-gypsum. It also vaporizes the material containing $P_2O_5$ values as well as the water in the phospho-gypsum. All of these gases, the material containing fluorine values, the material containing $P_2O_5$ values, and the water vapor, constitute a first gaseous stream.

The first gaseous stream is passed to a lime or limestone scrubber. In the scrubber, which preferably is about a 10 foot column filled with about 8″ limestone, the fluorine reacts with the surface of the limestone particles to produce fluorspar at temperatures of about 460° C. The fluorine is recovered by removing the limestone from the column, shaking the limestone on suitable screens to break off the fluorspar, and recycling the cleaned limestone.

The remaining hot gases, free of volatile fluorides, are used to generate steam in a waste heat boiler. The steam is used to operate a phosphoric acid plant.

The gases from the boiler are condensed in a condensor where the $P_2O_5$ values are recovered for use in the phosphoric acid plant.

The dried phospho-gypsum from the dryer, now substantially free of fluorides, is passed to a calciner where it is mixed with additional carbonaceous material, some of which is in the form of milled coal, and heated to about 1200°–1250° C. The carbonaceous material creates a reducing atmosphere in the calciner.

The lime is dissociated from the sulfur trioxide in the calciner and the $SO_3$ is immediately reduced to $SO_2$. The lime is cooled with excess air, which also eliminates all undesirable by-product gases, leaving a second gaseous stream from the calciner, which stream contains only $SO_2$, $CO_2$, $O_2$ and $N_2$. A few parts per thousand fluoride values also may be in this stream. This is removed subsequently as well as discussed in detail hereinafter.

The air used to cool the lime is passed in part to the dryer and in part recycled in the fluid bed calciner. The solid product form the calciner is siliceous lime which is stored and sold for commercial use.

The second gaseous stream is passed form the calciner to a lime or limestone scrubber where any remaining fluorine values are removed as fluorspar.

The stream from the scrubber goes through a conventional dust collector and through a gas to gas heat exchanger where it is cooled. The stream from the heat exchanger is mixed with ambient air before being passed through a sulfuric acid drying tower where water is removed.

The gases are at 55° C. into the $H_2SO_4$ drying tower which is fed from a sulfuric acid plant on premises. The acid from the drying tower goes to storage or to a phosphoric acid plant on premises.

The defluorinated and dryed gases from the tower are passed through the gas-to-gas heat exchanger previously mentioned where they are heated from about 55° C. to about 375° C., before being cycled to the sulfuric acid plant in a 10% $SO_2$ to 10% $O_2$ stream for the manufacture of sulfuric acid.

Thus, it is seen that this invention achieves all of the objects and advantages claimed therefor.

This invention also is intended to cover all changes and modifications of the example of the invention herein chosen for purposes of the disclosure which do not constitute departures from the spirit and scope of the invention.

What is claimed is:

1. In a process for treating phospho-gypsum waste product which is produced in the manufacture of phosphoric acid by the wet-acid process in which suitable phosphate rock is treated with sulfuric acid to product phosphoric acid and in which a mixture of phospho-gypsum waste product and carbonaceous material is heated to produce gaseous $SO_2$, $P_2O_5$ containing materials and HF containing materials, the improvement which comprises drying a mixture of phospho-gypsum waste product and carbonaceous material, removing a first gaseous stream containing water, acids and fluorine, separating the fluorine from said first gaseous stream by reacting with lime or limestone to produce fluorspar, recovering the fluorspar, calcining the dried phospho-gypsum under reducing conditions to produce a second gaseous stream containing $SO_2$, $CO_2$, $O_2$ and $N_2$ with substantially no fluorine values, and utilizing the said second gaseous stream in a sulfuric acid manufacturing plant.

2. The process of claim 1 including the step of scrubbing the second gaseous stream with lime or limestone to remove any remaining fluorine values.

3. The process of claim 1 including the step of scrubbing said second gaseous stream with $H_2SO_4$ to dry said stream.

4. A phospho-gypsum recovery process comprising the steps of drying a mixture of carbonaceous material and phospho-gypsum waste product produced in the manufacture of phosphoric acid by the wet-acid process to produce a first gaseous stream containing phosphorous and fluorine values, removing the fluorine values from the first gaseous stream by passing the said gaseous steam through a lime or limestone scrubber, calcining the dried phospho-gypsum in the presence of carbonaceous materials to dissociate the lime from the sulfur trioxide and produce a second gaseous stream, recovering siliceous lime, removing any remaining fluorine values from the second gaseous stream and passing the substantially fluorine free gaseous stream into a sulfuric acid manufacturing plant.

5. The process of claim 4 wherein the fluorine free gases from the scrubber are utilized to generate steam.

6. The process of claim 4 wherein the dryer is a fluidized bed.

7. The process of claim 4 wherein the dryer is at about 400°–600° C.

8. The process of claim 4 wherein the calciner has a reducing atmosphere and the second gaseous stream contains principally $SO_2$, $CO_2$, $O_2$ and $N_2$.

9. The process of claim 8 wherein the calciner is a fluidized bed and has a temperature of about 1200°–1250° C.

10. The process of claim 4 wherein the siliceous lime is cooled by air which is recirculated to the dryer.

11. The process of claim 8 wherein the second gaseous stream from the calciner is first passed through a lime or limestone scrubber where any remaining fluorine values are removed and then passed through a $H_2SO_4$ drying tower to remove substantially all of the remaining water.

12. The process of claim 11 wherein the dry substantially fluorine free gaseous stream exiting the $H_2SO_4$ drying tower is passed through a gas to gas heat exchanger with the second gaseous stream from the lime or limestone scrubber to heat the said fluorine free gaseous stream before it is utilized in the sulfuric acid plant.

* * * * *